United States Patent Office 3,597,286
Patented Aug. 3, 1971

3,597,286
METHOD OF TREATING A HIGH STRENGTH
HIGH DUCTILITY IRON-COBALT ALLOY
Donald R. Thornburg, Pittsburgh, Pa., assignor to Westinghouse Electric Corporation, Pittsburgh, Pa.
Filed Feb. 23, 1968, Ser. No. 707,775
Int. Cl. H01f 1/16
U.S. Cl. 148—120
7 Claims

ABSTRACT OF THE DISCLOSURE

Cold rolled iron-cobalt-vanadium soft magnetic alloy strip is annealed under carefully controlled conditions to produce a partially recrystallized grain structure; the alloy strip then having good strength and high ductility coupled with good magnetic properties as evidenced by a magnetic induction ($B_{250}$) of more than 22,000 gauss.

BACKGROUND OF THE INVENTION

An iron-cobalt soft magnetic alloy containing 50% by weight of each element has very high permeability at high flux densities together with a high saturation induction value. This alloy must be hot worked to produce rod or strip and it is extremely brittle at room temperature. In 1932, U.S. Patent No. 1,862,559 issued to White and Wahl covering the addition of up to 4% vanadium to the iron-cobalt alloy to provide an alloy which can be cold worked. This iron-cobalt-vanadium alloy, in the fully annealed condition, has been accepted by industry as being by far the best soft magnetic material for applications requiring high magnetic inductions at moderate fields, however, it is characterized by relatively poor mechanical properties, i.e., low yield strength and ductility.

In the aerospace industry, with its demand for lightweight high performance apparatus, applications await the development of a magnetic material having the magnetic characteristics of iron-cobalt-vanadium alloys, but with improved yield strength and ductility.

For example, in space power system the iron-cobalt vanadium alloys appear to be ideal for use as stator laminations for dynamoelectric machines, such as electrical generators. The usual method of manufacture of stator and rotor laminations for generators is to punch both laminations from a single sheet of the magnetic material being used. The stator lamination is a ring-shaped member and the rotor lamination is a disk-shaped member. Thus, ordinarily, both laminations are punched from a single magnetic steel blank, the rotor lamination being the central portion of the blank remaining after the ring-shaped stator lamination has been punched. The fully annealed iron-cobalt-vanadium alloys which have been available are well suited for use as stator laminations, but are not sufficiently strong or ductile enough for use as the rotor lamination, since the rotor is subjected to large rotational forces. It has therefore been proposed that after the stator lamination is punched, the central portion of the blank be discarded, since it is lacking in strength and ductility, and that the rotor lamination be punched from a different, stronger, more ductile magnetic material. This proposal is a very expensive solution to the problem because the iron-cobalt-vanadium alloys are relatively costly materials.

SUMMARY OF THE INVENTION

This invention is an improvement in iron-cobalt alloys which undergo an order-disorder phenomena and involves heat treating the alloy under closely controlled conditions to produce a desired metallurgical structure whereby the magnetic sheet is characterized by good mechanical and magnetic properties.

More specifically, the invention relates to iron-cobalt base alloys in the range of from 35% to 65% by weight of cobalt, from 0.5% to 4% vanadium, up to 1% chromium, up to 1% manganese, up to 0.5% silicon, and the balance about 65% to 30% being iron with small amounts of incidental impurities. Excellent results were had with alloys composed of from about 1% to about 4% by weight vanadium, preferably about 2% by weight of vanadium, and the balance essentially equal amounts of iron and cobalt, i.e. about 49% iron and 49% cobalt except for small amounts of incidental impurities. These alloys are vacuum induction melted, hot rolled, critically quenched through the order-disorder region and fully cold rolled to strips and sheets of desired gauge, which are then critically heat treated to produce a partially recrystallized grain structure. This partially recrystallized grain structure must be in the range from at least incipient recrystallization to about 50% total recrystallization. The amount of recrystallization may be determined by metallographic observation of the properties of new grains replacing or derived from the cold rolled structure. The magnetic alloy strip treated in the fashion described exhibits a yield strength in excess of 70,000 p.s.i. together with a ductility of over 8% elongation in 2 inches, with a magnetic induction ($B_{250}$) of over 22,000 gauss.

The annealing conditions utilized to accomplish the purposes of this invention will ordinarily involve temperatures of from about 670° C. to about 760° C. and the annealing time employed will be a time sufficient to produce at the annealing temperature the desired degree of recrystallization, longer times being used with the lower temperatures and shorter times being employed with the higher temperatures. Thus, annealing times as short as about three minutes have been successfully used at an annealing temperature of 760° C. On the other hand, an annealing time of seven hours has produced an equally satisfactory product at an annealing temperature of 685° C.

It is an object of this invention to provide a soft magnetic iron-cobalt-vanadium magnetic alloy having improved mechanical properties and good magnetic characteristics.

It is a further object of this invention to provide a process for making a soft magnetic iron-cobalt-vanadium alloy having exceptionally high ductility and good strength together with good magnetic characteristics.

Other objects and advantages of the invention will, in part, be obvious and will, in part, appear hereinafter.

DESCRIPTION OF THE PREFERRED EMBODIMENTS

By controlling the metallurgical structure of the alloy strip of this invention, through the use of special heat treatments unexpectedly good mechanical properties can be attained with retention of good magnetic inductions at high magnetizing fields. The chemical compositions of four alloy heats of the type sold under the trademark "HIPERCO 50," each heat of a different strip thickness, is set forth in Table I following:

TABLE I

| Heat No. | Chemical analysis in weight percent | | | | | | | | | | | Strip thickness, mils |
|---|---|---|---|---|---|---|---|---|---|---|---|---|
| | Co | V | C | S | O | P | Si | Mn | Al | Cu | Fe | |
| 1323 | 49.42 | 1.98 | 0.019 | 0.006 | 0.0008 | <0.005 | 0.21 | 0.07 | | <0.05 | Bal | 10 |
| 1273T | 49.14 | 1.91 | 0.024 | 0.005 | 0.0010 | <0.005 | 0.22 | 0.07 | 0.06 | | Bal | 12 |
| 1290B | 48.90 | 1.97 | 0.015 | 0.002 | 0.0004 | <0.005 | 0.25 | 0.11 | | <0.05 | Bal | 6 |
| 1314 | 49.21 | 1.94 | 0.020 | 0.008 | 0.0007 | <0.005 | 0.25 | 0.09 | | <0.05 | Bal | 8 |

The following Table II shows the properties of the 10 mil thick alloy Heat No. 1323 of Table I after annealing in dry hydrogen for 2 hours at various temperatures:

TABLE II

| Annealing temperature | $B_{100}$ | $B_{200}$ | $B_{250}$ | $H_c$ | Yield strength | Ultimate tensile strength | Percent elong. | Percent Recrystallization (vol. |
|---|---|---|---|---|---|---|---|---|
| (° C.) | (gauss) | (gauss) | (gauss) | (oe.) | (p.s.i.) | (p.s.i.) | in 2" | percent) |
| Cold rolled | 6,000 | 11,300 | 13,100 | 38.9 | 204,000 | 210,600 | 1 | 0 |
| 670 | 21,700 | 22,300 | 22,500 | 17.7 | 152,100 | 207,000 | 12 | 10 |
| 700 | 22,600 | 22,900 | 23,100 | 6.1 | 91,900 | 166,700 | 12 | 25 |
| 760 | 23,200 | 23,500 | 23,600 | 1.6 | 60,400 | 110,900 | 7 | 100 |

It will be noted from the above data that the iron-cobalt-vanadium alloy of this invention, annealed for 2 hours at 700° C. has a yield strength in excess of 90,000 p.s.i. and a ductility greater than 10%, while the $B_{250}$ value is above 23,000 gauss. The table also indicates that a lower annealing temperature produces higher strength values but with substantial degradation in magnetic properties. The cold rolled material, although having excellent strength values has very poor magnetic properties. It is thus seen that a wide range of magnetic and mechanical properties can be obtained by appropriate selection of the annealing conditions. For most applications now in view, it appears that the annealing conditions should be selected so that the coercive force obtained is less than 10 oersteds and the percent elongation is greater than 10.

Figure 1:
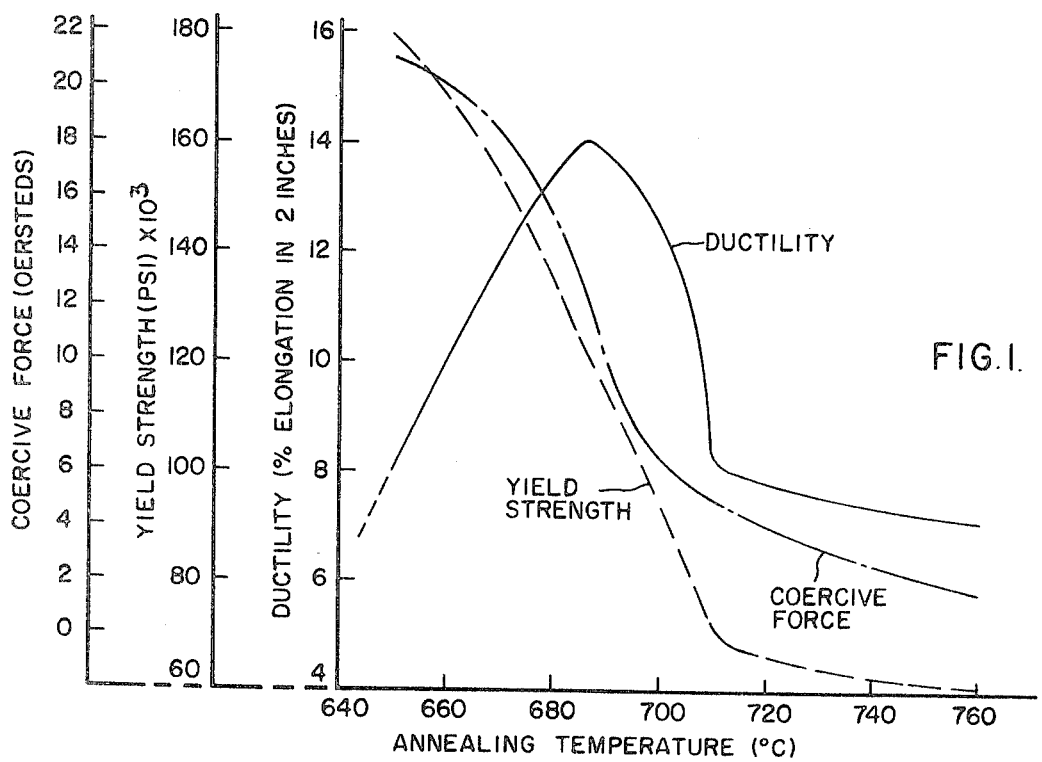
FIG. 1 is a series of curves in which yield strength ductility and coercive force are plotted against annealing temperature for the alloy strip of this invention.

The relationships between annealing temperature and the mechanical and magnetic properties in the iron-cobalt-vanadium alloys is shown in FIG. 1. Of particular importance is the fact that there is a definite peak in the ductility curve around 685° C. which indicates the potential usefulness of this alloy in applications where high ductility and yield strength are required, such as in high speed rotor applications. The sharp peak in the ductility curve in this temperature range is highly unexpected for the reason that the ductility of a cold worked specimen normally increases as the recrystallization process proceeds, with maximum ductility normally attained when complete recrystallization has occurred. The peak in ductility properties is unexpected in this temperature range for the further reason that this same temperature range is in the ordering region for this alloy, and the ordering of this alloy is ordinarily associated with decreased ductility.

It should be noted that the effect of increasing or decreasing annealing time is to shift the curves of FIG. 1 to the left or right respectively. This is merely stating in another way that longer annealing periods are associated with lower annealing temperature and shorter annealing periods with higher temperatures.

The annealing time-temperature relationships in this alloy system were extensively studied and the results appear in Table III below. For this study, alloy Heat No. 1314 of Table I was annealed at temperatures in the range from 685° C. to 760° C. for periods from 7 hours to 3 minutes.

TABLE III.—EFFECT OF HEAT TREATMENT ON MAGNETIC AND MECHANICAL PROPERTIES OF ALLOY HEAT NO. 1314

| Temperature (° C.) | Time (min.) | Yield strength (p.s.i.) | Ultimate tensile strength (p.s.i.) | Percent elong. in 2" | $B_{100}$ (gauss) | $B_{200}$ (gauss) | $B_{250}$ (gauss) | $H_c$ (oe.) | Percent recrystallization (vol. percent) |
|---|---|---|---|---|---|---|---|---|---|
| 760 | 3 | 106,900 | 196,100 | 16 | 22,500 | 22,300 | 23,200 | 6.3 | 35 |
| 755 | 3 | 123,000 | 224,700 | 20 | 22,600 | 23,000 | 23,300 | 8.0 | 25 |
| 720 | 15 | 110,700 | 208,100 | 20 | 22,600 | 23,100 | 23,200 | 7.3 | 35 |
| 710 | 30 | 113,700 | 207,100 | 19 | 22,700 | 23,100 | 23,100 | 9.1 | 20 |
| 700 | 60 | 110,600 | 183,300 | 14 | 22,400 | 23,100 | 23,100 | 8.1 | 35 |
| 700 | 120 | 88,300 | 156,200 | 10 | 22,700 | 23,100 | 23,200 | 5.5 | |
| 700 | 120 | 85,200 | 158,300 | 12 | 22,800 | 22,900 | 23,000 | 4.4 | 40 |
| 700 | 150 | 83,200 | 154,700 | 11 | 22,900 | 23,200 | 23,100 | 4.1 | 45 |
| 685 | 420 | 96,000 | 189,700 | 16 | 22,600 | 23,000 | 23,100 | 7.1 | 35 |

From the above Table III, the remarkably consistent properties of the alloy strip under all annealing conditions used, is clearly evident. Thus, the yield strength of the alloy strip under all annealing conditions exceeds 80,000 p.s.i. and the ductility is equal to, or exceeds, 10% elongation in all cases. Turning to the magnetic properties, the coercive force ($H_c$) is less than 10 oersteds in every instance, and the magnetic induction ($B_{250}$) is 23,000 gauss or higher in each case. By controlling the metallurgical structure through careful selection of annealing conditions, highly desirable combinations of mechanical and magnetic properties have thus been achieved.

Figure 2:
FIGS. 2 through 5 are photomicrographs at 500× of the alloy strip of this invention in the cold rolled condition and after annealing for two hours at several annealing temperatures.
Figure 3:
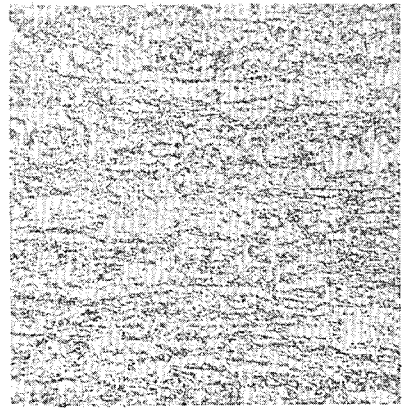
Figure 4:
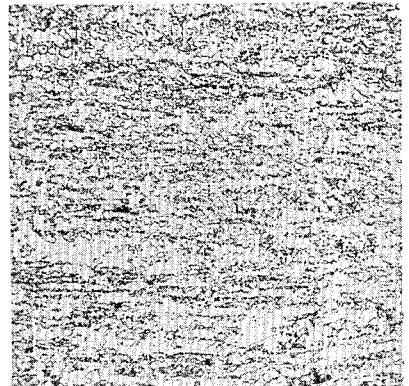
Figure 5:
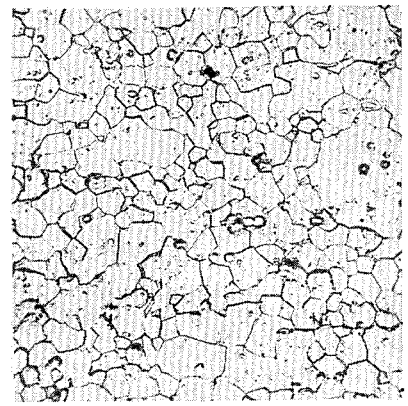

Four states of the 10 mil alloy strip are microstructurally illustrated in FIGS. 2 through 5. FIG. 2 shows the typical fibrous cold rolled structure that is not well resolved even at 500X. FIGS. 3 to 5 are photomicrographs of alloy strip after annealing for two hours at various temperatures. The micrograph of FIG. 3 indicates a sharpening of the structure due to the recovery during the anneal at 670° C., and incipient recrystallization. In FIG. 4, with the annealing temperature at 700° C., less than 50% recrystallized grains are present. In FIG. 5 complete recrystallization has occurred with grain growth at an annealing temperature of 760° C. The degree of recrystallization is measured by optical metallographic techniques. In general it would be expected that heat treating cycles which produce structures similar to those illustrated in these photomicrographs will produce similar mechanical and magnetic properties.

The three other thicknesses (12, 8 and 6 mil) of commercial iron-cobalt-vanadium magnetic alloy of Table I were subjected to a 700° C. anneal for a period of two hours and evaluated as is shown in the following Table IV. Data for the 10 mil material (Alloy Heat No. 1323) is also included for purposes of comparison.

TABLE IV

| Thickness (mils) | $B_{100}$ (gauss) | $B_{200}$ (gauss) | $B_{250}$ (gauss) | $H_c$ (oe.) | Yield strength (p.s.i.) | Ultimate tensile strength (p.s.i.) | Percent elong. in 2" |
|---|---|---|---|---|---|---|---|
| 12 | 22,700 | 23,000 | 23,100 | 4.4 | 78,900 | 145,700 | 11 |
| 10 | 22,600 | 22,900 | 23,100 | 6.1 | 91,900 | 166,700 | 12 |
| 8 | 22,700 | 23,100 | 23,400 | 5.5 | 88,300 | 156,200 | 10 |
| 6 | 22,700 | 23,000 | 23,100 | 5.6 | 73,900 | 157,300 | 11 |

The data presented above in Table IV indicates a high degree of reproducibility using the novel annealing treatment of the invention in producing good high field inductions, good ductility and reasonably good yield strength. It was found that the transverse yield strength is somewhat higher than the yield strength in the rolling direction, while the transverse elongation is comparable to those in the rolling direction.

Figure 6:
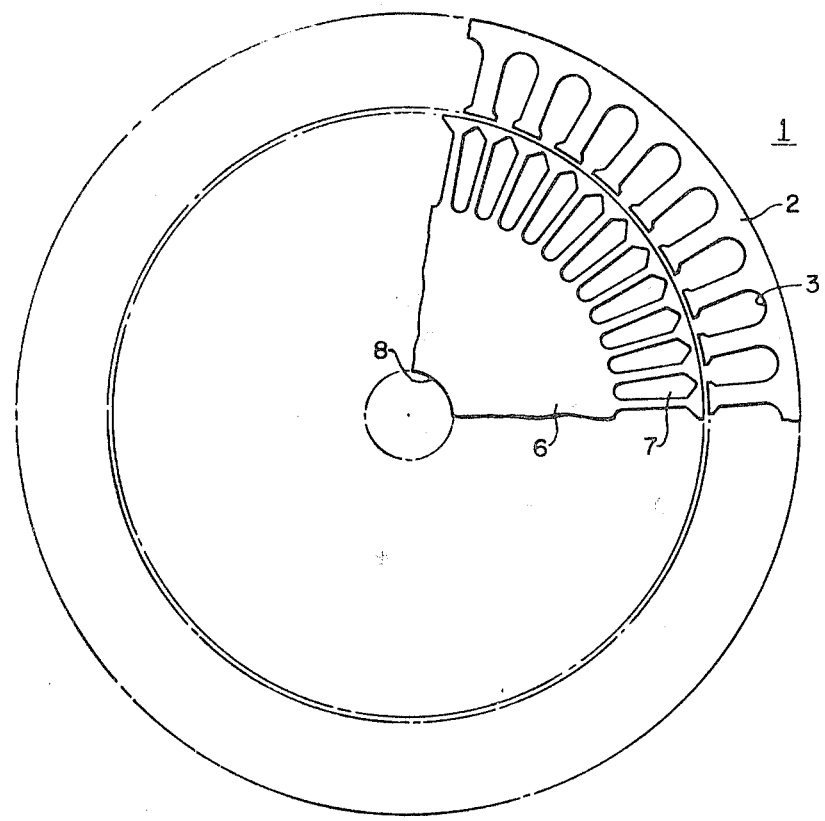
FIG. 6 is an illustration of a stator and rotor lamination as punched from a magnetic alloy blank.

FIG. 6 shows the relationship of a pair of stator and rotor punchings 1 for a generator, punched from a single sheet of magnetic alloy. The stator punching 2 is a ring-shaped member having a plurality of conductor slots 3 on the internal periphery of the ring. The rotor punching 6 is composed of the material remaining at the center of the magnetic sheet after the stator punching has been made. The stator punching has a plurality of conductor slots 7 on the periphery thereof and a shaft hole 8 at the center provided so that a plurality of rotor laminations can be assembled on the shaft of the generator. It is clear from FIG. 6 that the most economical use of material can be effected when both the stator lamination and the rotor lamination can be made from the same sheet of material. On the other hand, a great waste of material is involved if the material at the center of the magnetic sheet remaining after the stator lamination has been punched must be discarded. Following the teachings of the present invention the magnetic sheet could be delivered in the partially recrystallized condition, the stator and rotor laminations punched from the sheet, and then only the stator lamination additionally fully annealed to produce maximum magnetic properties, while the rotor lamination may be used in the partially recrystallized high ductility condition. Alternatively, the magnetic sheet could be delivered in the cold rolled condition, the laminations punched, and then the stator and rotor laminations separately annealed; the rotor lamination to a partially recrystallized condition and the stator lamination to the fully recrystallized condition.

There has thus been presented a process for obtaining a magnetic material having high magnetic inductions in moderate fields together with good strength and greatly improved ductility.

It will be understood by those skilled in the art that although the invention has been described in connection with preferred embodiments, modification and variations in composition in the processing schedule and in other aspects of the invention may be employed without departing from the underlying spirit and scope of the invention.

I claim as my invention:

1. In the process for making magnetic alloy suitable for applications requiring high magnetic inductions at moderate fields and having high strength and ductility rendering it particularly suitable for use in movable power equipment, the steps comprising selecting an alloy from the iron-cobalt system which consisting essentially of from 35% to 65% cobalt and 64% to 30% iron and which alloy is subject to an order-disorder transformation phenomena, working said alloy to produce a cold worked product of desired finish gauge and thereafter heat treating the cold worked product to effect recovery and partial recrystallization, said partial recrystallization ranging from incipent recrystallization to about 50% recrystallization.

2. The process of claim 1 in which the selected alloy consists essentially of from 0.5% to 4% vanadium, substantially equal parts of iron and cobalt and incidental impurities and in which the heat treatment is performed at a temperature within the range between 670° C. and 760° C.

3. The process of claim 1 in which the heat treatment is performed at a temperature within the range between about 670° C. and about 760° C. for a time period of about 3 minutes to about 7 hours, the longer times being associated with lower temperatures and the shorter times associated with the higher temperatures.

4. The process of claim 1 in which the alloy contains about 2% vanadium, up to 1% chromium, up to 1% manganese, up to 0.5% silicon and the balance substantially equal parts of iron and cobalt with incidental impurities and in which the heat treatment is carried out at a temperature within the range between 670° C. and 760° C. and for a time period within the range between about 7 hours and about 3 minutes.

5. A process for producing a pair of stator ring and rotor disk laminations suitable for use in a dynamoelectric machine from cold worked magnetic alloy, the alloy consisting essentially of from about 0.5% to about 4% vanadium, up to 1% chromium, up to 1% manganese, up to 0.5% silicon and the balance essentially equal parts of iron and cobalt with incidental impurities and which alloy undergoes an order-disorder transformation phenomena, the steps comprising, punching the stator ring and the rotor disk from the cold worked alloy, heat treating the rotor lamination to effect recovery and partial recrystallization, said partial recrystallization ranging from incipient recrystallization to about 50% recrystallization to provide a yield strength of at least 70,000 p.s.i., a ductility of at least 8%, a coercive force of less than 10 oersteds and a magnetic induction ($B_{250}$) of at least 22,000 gauss and heat treating the stator ring to fully recrystallize the same and provide maximum magnetic characteristics thereto.

6. The process of claim 5 in which the rotor disk is heat treated at a temperature within the range between 670° C. and 760° C. for a time period of between 3 minutes and 7 hours.

7. The process of claim 6 in which the stator laminations and the rotor laminations are assembled to form the stator and rotor of a dynamoelectric machine.

(References on following page)

References Cited

UNITED STATES PATENTS

| | | | |
|---|---|---|---|
| 1,862,559 | 6/1932 | White | 148—121X |
| 2,292,191 | 8/1942 | Brandt et al. | 148—122 |
| 2,506,393 | 1/1947 | Smolvehowski | 148—120 |
| 2,512,358 | 6/1950 | McGeary | 148—120X |
| 2,717,223 | 9/1955 | Binstock et al. | 148—122 |
| 3,148,092 | 9/1964 | Shull, Jr. | 148—120X |

L. DEWAYNE RUTLEDGE, Primary Examiner

G. K. WHITE, Assistant Examiner

U.S. Cl. X.R.

148—121